(12) United States Patent
Bookbinder et al.

(10) Patent No.: US 9,505,655 B2
(45) Date of Patent: *Nov. 29, 2016

(54) OPTICAL FIBER COATING COMPOSITIONS WITH NON-CURABLE REINFORCING AGENTS

(71) Applicant: Corning Incorporated, Corning, NY (US)

(72) Inventors: Dana Craig Bookbinder, Corning, NY (US); Michelle Dawn Fabian, Horseheads, NY (US); Kevin Robert McCarthy, Horseheads, NY (US); Weijun Niu, Painted Post, NY (US); David Neal Schissel, Painted Post, NY (US); Michael James Winningham, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 128 days.

This patent is subject to a terminal disclaimer.

(21) Appl. No.: 14/248,692

(22) Filed: Apr. 9, 2014

(65) Prior Publication Data
US 2014/0341524 A1   Nov. 20, 2014

Related U.S. Application Data

(60) Provisional application No. 61/824,484, filed on May 17, 2013.

(51) Int. Cl.
| | | |
|---|---|---|
| *C08J 3/28* | (2006.01) | |
| *C08F 2/46* | (2006.01) | |
| *C08G 61/04* | (2006.01) | |
| *C03C 25/10* | (2006.01) | |
| *G02B 1/04* | (2006.01) | |
| *G02B 6/02* | (2006.01) | |
| *C09D 4/06* | (2006.01) | |

(52) U.S. Cl.
CPC ............ *C03C 25/1055* (2013.01); *C09D 4/06* (2013.01); *G02B 1/045* (2013.01); *G02B 6/02395* (2013.01)

(58) Field of Classification Search
CPC ............... C03C 25/1055; G02B 2006/12069; G02B 6/02395; G02B 6/02033; C09D 4/06; C08F 2220/1824; C08F 265/06; C08F 220/54
USPC ......................................... 522/113, 1; 520/1
See application file for complete search history.

(56) References Cited

U.S. PATENT DOCUMENTS

| 6,810,187 B2 | 10/2004 | Fabian et al. ................ 385/128 |
| 2001/0008906 A1* | 7/2001 | Chawla .............. C09D 155/005 522/90 |
| 2007/0100039 A1* | 5/2007 | Hancock ............... C08F 283/00 524/186 |
| 2014/0341521 A1* | 11/2014 | Fabian .................... G02B 6/245 385/128 |
| 2015/0219845 A1* | 8/2015 | Bookbinder ............. G02B 1/14 385/128 |
| 2015/0338555 A1* | 11/2015 | Bookbinder ............. G02B 1/14 428/375 |

FOREIGN PATENT DOCUMENTS

| CN | 101654571 A | 2/2010 |
| EP | 2041230 B1 | 9/2010 |
| KR | 2009069144 A | 6/2009 |
| RU | 2387634 | 4/2010 |
| WO | 98/10002 | 3/1998 |
| WO | 2008/076285 | 6/2008 |

OTHER PUBLICATIONS

T. Liu, et. al., "A new approach to shape memory polymer: design and preparation of poly(methyl methacrylate) composites in the presence of star poly(ethylene glycol", Soft Matter, 7, 1641-1643, 2011.
G. Mallucelli, et. al., "Photopolymerization pf poly(tetramethylene ether) glycol diacrylates and properties of the obtained networks", Polymer, 37, 2565-2571, 1996.
G. Mallucelli, et. al., "Synthesis of Poly (propylene-Glycol-Diacrylates) and Properties of the Photocured Networks" , J. Appl. Poly. Sci., 65, 491-497, 1997.
G. Mallucelli, et. al., Book, Current Trends in Poly. Sci., 2, 203-216, 1997.
D. J. A. Cameron et al., "Aliphatic polyester polymer stars: synthesis, properties and applications in biomedicine and nanotechnology", Chem. Soc. Rev., 40, 1761-1776, 2011.
Y. Zhang, et al. "Photopolymerization behavior and properties of highly branched poly(thioether-urethane) acrylates used for UV-curing coatings", Prog. Org. Coatings, 71, 399-405, 2011.
M. Morell, et. al., "Multiarm Star Poly(glycidol)-block-Poly(ε-caprolactone) of Different Arm Lengths and Their Use as Modifiers of Diglycidylether of Bisphenol a Thermosets", J. Poly. Sci. Part A: Poly. Chem., 49, 2395-2406, 2011.
J.-L. Wietor, et. al., "Effects of Branching and Crystallization of Pheology of Polycaprolactone Supramolecular Polymers with Ureidopyrimidinone End Groups", Macromolecules, 44, 1211-1219, 2011.

\* cited by examiner

*Primary Examiner* — Ling Choi
*Assistant Examiner* — Jessica E Whiteley
(74) *Attorney, Agent, or Firm* — Kevin L. Bray

(57) ABSTRACT

A coating composition including a reinforcing agent. The coating composition may include one or more radiation-curable monofunctional monomers, one or more radiation-curable multifunctional monomers or oligomers, a photoinitiator, and a reinforcing agent. The monofunctional monomers, multifunctional monomers, and multifunctional oligomers may include acrylate groups. The reinforcing agent may be an acrylic co-polymer that includes two or more repeat units. At least one of the repeat units includes chemical groups that enable self-association of the acrylic co-polymer. Self-association of the acrylic co-polymer may improve the tensile strength of coatings formed from the coating compositions.

26 Claims, No Drawings

OPTICAL FIBER COATING COMPOSITIONS WITH NON-CURABLE REINFORCING AGENTS

This application claims the benefit of priority under 35 U.S.C. §119 of U.S. Provisional Application Ser. No. 61/824,484 filed on May 17, 2013 the content of which is relied upon and incorporated herein by reference in its entirety.

FIELD

The present disclosure relates to compositions used to form coatings for optical fibers. More particularly, this disclosure relates to coating compositions based on radiation-curable monomers that include reinforcing agents that enhance the tensile strength of coatings formed from the compositions. Most particularly, this disclosure relates to coating compositions based on radiation-curable monomers that include a non-curable acrylic co-polymer.

TECHNICAL BACKGROUND

The light transmitting performance of an optical fiber is highly dependent upon the properties of the polymer coating that is applied to the fiber during manufacturing. Typically a dual-layer coating system is used where a soft primary coating is in contact with the glass fiber and a harder secondary coating surrounds the primary coating. The harder secondary coating protects the fiber from damage caused by external forces and allows the fiber to be handled without concern of breakage. The softer primary coating dissipates forces that reach the interior of the coated fiber and preventing them from being transferred to the fiber. The primary coating is especially important in dissipating stresses that arise when the fiber is bent. The influence of bending stresses on the fiber needs to be minimized because bending stresses create local perturbations in the refractive index profile of the glass fiber that act to attenuate the intensity of light guided by the fiber. By dissipating stresses, the primary coating minimizes bend-induced attenuation losses. There remains a need for economical low modulus coating materials that possess high tensile strength.

SUMMARY

This disclosure provides a coating composition for optical fibers. The coating composition may include a radiation-curable component and a reinforcing agent. The radiation-curable component may include a (meth)acrylate monomer or oligomer. As used herein, the term "(meth)acrylate" means acrylate or methacrylate. The (meth)acrylate monomer or oligomer may be monofunctional or multifunctional and may lack urethane linkages, urea linkages, or groups that react to form urethane or urea linkages. The radiation-curable component may include a polyol di(meth)acrylate. The reinforcing agent may include a co-polymer that lacks urethane linkages, urea linkages, and radiation-curable groups. The co-polymer may be chemically non-reactive. The co-polymer may include two or more repeat units derived from two or more co-monomers. The co-monomers may include acrylate or methacrylate groups. The co-monomers may react to form an acrylic co-polymer. At least one of the co-monomers includes a chemical group capable of interacting with itself, other constituents of the coating composition and/or cured product formed from the coating composition through hydrogen bonding or polar interactions. At least one of the co-monomers includes chemical groups that enable self-association of the co-polymer. The coating composition may include a photoinitiator to initiate curing of the coating composition upon photoexcitation. Curing of the radiation-curable component provides a low modulus, crosslinked acrylic coating that may internally incorporate the co-polymer. The co-polymer may interact with itself or elements of the crosslinked coating to impart mechanical strength to the coating and improve tensile strength. The co-polymer may self-associate or interact with other components of the coating composition or cured coating formed from the coating composition through hydrogen bonding, polar interactions, or other intermolecular forces.

The coating composition may include a polyol di(meth)acrylate monomer or oligomer along with acrylic monomer diluents. The composition may further include an acrylic co-polymer as a reinforcing agent to improve tensile strength. The acrylic co-polymer may lack a radiation-curable group and may also lack urethane and urea linkages. The acrylic co-polymer may also lack a hard/soft block configuration. The acrylic co-polymer may be non-reactive.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

The present disclosure provides a coating composition and coating for optical fibers. The coating composition is radiation-curable and upon curing, forms a fiber coating that has low modulus and high tensile strength. The coating composition may include a radiation-curable component and a reinforcing agent. The radiation-curable component may include a monomer or oligomer. The reinforcing agent may be non-reactive and/or non-radiation-curable. The reinforcing agent may be a co-polymer or an acrylic co-polymer. The co-polymer or acrylic co-polymer may include chemical groups that permit self-association. The coating composition may also include one or more monofunctional monomers. The monofunctional monomers may act as diluents. The coating composition may include a photoinitiator. The photoinitiator may initiate curing of the coating composition upon exposure to UV radiation.

The radiation-curable component may include a monofunctional or multifunctional monomer. The monomer may include a multifunctional (meth)acrylate monomer. The monomer may include polyether(meth)acrylates, polyester (meth)acrylates, or polyol(meth)acrylates. The multifunctional monomer may be a di(meth)acrylate, tri(meth)acrylate, tetra(meth)acrylate, or higher (meth)acrylate. Polyol (meth)acrylates may include polyalkoxy(meth)acrylates.

Radiation-curable monomers may also include ethylenically-unsaturated compounds, ethoxylated(meth)acrylates, ethoxylated alkylphenol mono(meth)acrylates, propylene oxide(meth)acrylates, n-propylene oxide(meth)acrylates, isopropylene oxide(meth)acrylates, monofunctional (meth) acrylates, monofunctional aliphatic epoxy(meth)acrylates, multifunctional (meth)acrylates, multifunctional aliphatic epoxy(meth)acrylates, and combinations thereof. The monomer component may include compounds having the general formula $R_2$—$R_1$—O—$(CH_2CH(CH_3)$—O$)_n$—COCH=$CH_2$, where $R_1$ and $R_2$ are aliphatic, aromatic, or a mixture of both, and n=1 to 10, or $R_1$—O—$(CH_2CH(CH_3)$—O$)_n$—COCH=$CH_2$, where $R_1$ is aliphatic or aromatic, and n=1 to 10, or formula $R_2$—$R_1$—O—$(CH_2CH_2$—O$)_n$—COCH=$CH_2$, where $R_1$ and $R_2$ are aliphatic, aromatic, or a mixture of both, and n=1 to 10, or $R_1$—O—$(CH_2CH_2$—O$)_n$—COCH=$CH_2$, where $R_1$ is aliphatic or aromatic, and n=1 to 10.

Representative radiation-curable monomers include ethylenically unsaturated monomers such as ethylhexyl acrylate, lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

The radiation-curable component of the coating composition may include a multifunctional (meth)acrylate. As used herein, the term "(meth)acrylate" means acrylate or methacrylate. Multifunctional (meth)acrylates are (meth)acrylates having two or more polymerizable (meth)acrylate moieties per molecule. The multifunctional (meth)acrylate may have three or more polymerizable (meth)acrylate moieties per molecule. Examples of multifunctional (meth) acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), and dipentaerythritol pentaacrylate (e.g., PHOTOMER 4399, IGM Resins, and SR399, Sartomer Company, Inc.). A multifunctional (meth)acrylate may be present in the radiation-curable coating composition at a concentration of from 0.05-15 wt %, or from 0.1-10 wt %, or from 1-50 wt % or from 5-40 wt %.

The radiation-curable component of the coating composition may include an N-vinyl amide such as an N-vinyl lactam, or N-vinyl pyrrolidinone, or N-vinyl caprolactam. The N-vinyl amide monomer may be present in the radiation-curable composition at a concentration from 0.1-40 wt %, or from 2-10 wt %.

The radiation-curable coating composition may include one or more monofunctional (meth)acrylate monomers in an amount from 5-95 wt %, or from 0-75 wt %, or from 40-65 wt %. The curable coating composition may include one or more monofunctional aliphatic epoxy(meth)acrylate monomers in an amount from 5-40 wt %, or from 10-30 wt %.

The radiation-curable component of the coating composition may include a hydroxyfunctional monomer. A hydroxyfunctional monomer is a monomer that has a pendant hydroxy moiety in addition to other reactive functionality such as (meth)acrylate. Examples of hydroxyfunctional monomers including pendant hydroxyl groups include caprolactone acrylate (available from Dow Chemical as TONE M-100); poly(alkylene glycol) mono(meth)acrylates, such as poly(ethylene glycol) monoacrylate, poly(propylene glycol) monoacrylate, and poly(tetramethylene glycol) monoacrylate (each available from Monomer, Polymer & Dajac Labs); 2-hydroxyethyl(meth)acrylate, 3-hydroxypropyl(meth)acrylate, and 4-hydroxybutyl(meth)acrylate (each available from Aldrich).

The hydroxyfunctional monomer may be present in the radiation-curable coating composition in an amount between about 0.1 wt % and about 25 wt %, or in an amount between about 5 wt % and about 8 wt %. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the primary coating. Hydroxyfunctional monomers are described in more detail in U.S. Pat. No. 6,563,996, the disclosure of which is hereby incorporated by reference in its entirety.

The total monomer content of the radiation-curable coating composition may be between about 5 wt % and about 95 wt %, or between about 30 wt % and about 75 wt %, or between about 40 wt % and about 65 wt %.

The radiation-curable component may include a monofunctional or multifunctional oligomer. The oligomer may be a (meth)acrylate-terminated oligomer. The oligomer may include polyether acrylates (e.g., GENOMER 3456, available from Rahn AG), polyester acrylates (e.g., EBECRYL 80, 584 and 657, available from Cytec Industries Inc.), or polyol acrylates. The oligomer may be a di(meth)acrylate, tri(meth)acrylate, tetra(meth)acrylate, or higher (meth)acrylate. Polyol(meth)acrylates may include polyalkoxy(meth) acrylates.

The oligomer of the curable primary coating composition may include a soft block with a number average molecular weight ($M_n$) of about 4000 g/mol or greater. Examples of such oligomers are described in U.S. patent application Ser. No. 09/916,536, the disclosure of which is incorporated by reference herein in its entirety. The oligomers may have flexible backbones, low polydispersities, and/or may provide cured coatings of low crosslink densities.

The oligomers may be used singly, or in combination to control coating properties. The total oligomer content of the radiation-curable coating composition may be between about 5 wt % and about 95 wt %, or between about 25 wt % and about 65 wt %, or between about 35 wt % and about 55 wt %.

The radiation-curable coating composition may include a reinforcing agent. The reinforcing agent may be a strength additive included in the coating composition to increase the tensile strength of the coating formed from the radiation-curable coating composition. The reinforcing agent may be a co-polymer. The co-polymer may be formed from a reaction of two or more co-monomers. The co-polymer may include two or more repeat units derived from the two or more co-monomers. The co-monomers may include (meth)acrylates or acrylamides. The (meth)acrylate or acrylamide co-monomers may include chemical groups that participate in hydrogen bonding. The chemical groups may include hydrogen bond donor groups or hydrogen bond acceptor groups. Hydrogen bond donor groups may include N—H, O—H or —CO$_2$H groups. Hydrogen bond acceptor groups may include carbonyl groups, ether groups, or nitrogen. The hydrogen-bonding groups may be present along the backbone of the polymer formed from the co-monomers or in pendent groups of the polymer formed from the co-monomers. The (meth)acrylate co-monomers may include polar groups. The polar groups may be present along the backbone of the polymer formed from the co-monomers or in pendent groups of the polymer formed from the co-monomers. Hydrogen bond donor groups, hydrogen bond acceptor groups, and polar groups present in one or more of the co-monomers may enable self-association of the co-polymer formed from the co-monomers.

The co-polymer may be an acrylic co-polymer formed from a reaction between two or more (meth)acrylate co-monomers. The co-monomers may interact weakly or strongly with each other or other co-monomers. Co-monomers with weaker interactions may include esters of (meth) acrylic acid. Representative co-monomers with weaker interactions include:

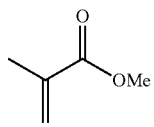 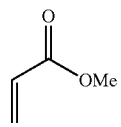 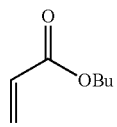

Methylmethacrylate (MMA)  Methyl acrylate (MA)  Butyl acrylate (BA)

Other monomers with weaker interactions include (1) α,β-unsaturated esters: for example, ethyl acrylate (or methacrylate), propyl acrylate (or methacrylate), butyl acrylate (or methacrylate), pentyl acrylate (or methacrylate), hexyl acrylate (or methacrylate), heptyl acrylate (or methacrylate), octyl acrylate (or methacrylate), nonyl acrylate (or methacrylate), decyl acrylate (or methacrylate), undecyl acrylate (or methacrylate), dodecyl acrylate (or methacrylate), tridecyl acrylate (or methacrylate), tetradecyl acrylate (or methacrylate), pentadecyl acrylate (or methacrylate), hexadecyl acrylate (or methacrylate), heptadecyl acrylate (or methacrylate), octadecyl acrylate (or methacrylate), nonadecyl acrylate (or methacrylate), icosyl acrylate (or methacrylate), and their corresponding structural isomers or halogenated derivatives, ethylene (or propylene) glycol methyl ether acrylates (or methacrylates), poly(ethylene (or propylene) glycol) methyl ether acrylates, isobornyl acrylate, benzyl acrylate (or methacrylate) and their derivatives (or methacrylates); (2) Alkyl vinyl ethers: for example, methyl vinyl ether, ethyl vinyl ether, propyl vinyl ether, butyl vinyl ether, pentyl vinyl ether, hexyl vinyl ether, heptanyl vinyl ether, octyl vinyl ether, nonyl vinyl ether, decyl vinyl ether, undecyl vinyl ether, dodecyl vinyl ether, tridecyl vinyl ether, tetradecyl vinyl ether, pentadecyl vinyl ether, hexadecyl vinyl ether, heptadecyl vinyl ether, and their corresponding structural isomers; (3) acrylonitrile; and (4) unsaturated hydrocarbons: for example, ethylene, propylene, butylene, hexene, or octene.

Co-monomers with stronger interactions may include (meth)acrylamides, N-vinyl(meth)acrylamides, N-vinyl amide, (meth)acrylic acid, or α,β-unsaturated lactones and amides. Representative co-monomers with stronger interactions include:

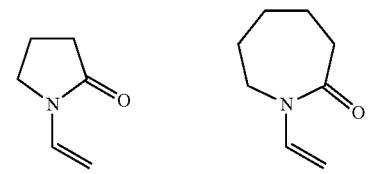

N-Vinylpyrrolidinone (VPD)   N-Vinylcaprolactam (VCA)

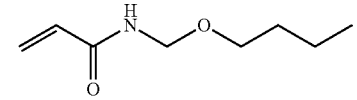

N-(Butoxymethylmethyl)acrylamide (BUOMAM)

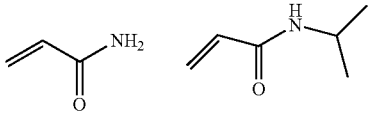

Acrylamide (AM)   N-Isopropylacrylamide (MAM)

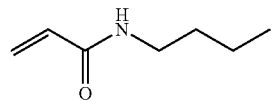

N-Butylacrylamide (nBAM)

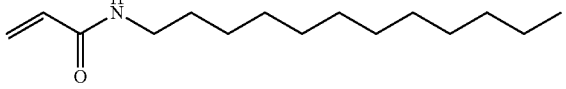

N-Dodecylacrylamide (nDAM)

N-Vinylpyrrolidinone (VPD) may also be referred to herein as N-Vinylpyrrolidone.

The nitrogens in N-Vinylpyrrolidone and N-Vinylcaprolactam may function as hydrogen bond acceptor groups. The N—H groups of N-(Butoxymethylmethyl)acrylamide (BUOMAM), acrylamide (AM), N-Isopropylacrylamide (MAM), N-Butylacrylamide (nBAM), N-Dodecylacrylamide (nDAM), and other N-substituted acrylamides may function as hydrogen bond donor groups. The carbonyl groups may function as hydrogen bond acceptor groups. Methylmethacrylate (MMA), methyl acrylate (MA), and butyl acrylate (BA) lack hydrogen bond donor groups.

Other monomers with stronger interactions include: N,N-dialkyl(meth)acrylamide; α,β-unsaturated monomers with a hydrogen bond donor group including (1) α,β-unsaturated amides: acrylamide (or methacrylamide): for example, N-methyl acrylamide (or methacrylamide), N-ethyl acrylamide (or methacrylamide), N-propyl acrylamide (or methacrylamide), N-butyl acrylamide (or methacrylamide), N-pentyl acrylamide (or methacrylamide), N-hexyl acrylamide (or methacrylamide), N-heptanyl acrylamide (or methacrylamide), N-octyl acrylamide (or methacrylamide), N-nonyl acrylamide (or methacrylamide), N-decyl acrylamide (or methacrylamide), N-undecyl acrylamide (or methacrylamide), N-dodecyl acrylamide (or methacrylamide), N-tridecyl acrylamide (or methacrylamide), N-tetradecyl acrylamide (or methacrylamide), N-pentadecyl acrylamide (or methacrylamide), N-hexadecyl acrylamide (or methacrylamide), N-heptadecyl acrylamide (or methacrylamide), N-octadecyl acrylamide (or methacrylamide), N-nonadecyl acrylamide (or methacrylamide), N-icosyl acrylamide (or methacrylamide), and their corresponding structural isomers, N-(Butoxymethyl)acrylamide, N-(hydroxymethyl) acrylamide; 2) acrylic acid and carboxylate-functionalized α,β-unsaturated esters: for example, 2-carboxyethyl acrylate; 2-carboxyethyl acrylate oligomers; and (3) hydroxyl-functionalized α,β-unsaturated esters: hydroxypropyl acrylate, 4-hydroxybutyl acrylate.

The molecular weight of the acrylic co-polymer may be between 1,000 g/mol and 250,000 g/mol, or between 1,500 g/mol and 150,000 g/mol, or between 1,500 g/mol and 100,000 g/mol, or between 2,000 g/mol and 75,000 g/mol. For primary or secondary coatings, the acrylic co-polymer may have a glass transition temperature less than or equal to 0° C., or less than or equal to −20° C., or less than or equal to −40° C. The acrylic co-polymer may be a block co-polymer. The acrylic block co-polymer may have one or more glass transition temperatures, where at least one of the one or more glass transition temperatures is less than or equal to −20° C. For secondary coatings, the acrylic co-polymer may have a glass transition temperature greater than or equal to 0° C., or greater than or equal to 40° C., or greater than or equal to 65° C. The Young's modulus of the primary coating may be less than 2 MPa, or less than 1 MPa, or less than 0.5 MPa. The Young's modulus of the secondary coating may be greater than 100 MPa, or greater than 500 MPa, or at least about 1200 MPa, or least about 1500 MPa, or at least about 1900 MPa.

Acrylic co-polymers may be prepared by a free-radical polymerization reaction. The free-radical polymerization reaction may include an initiator and may be carried out in bulk mixtures of the co-monomers or with co-monomers in the presence of a solvent. The free-radical polymerization reaction may also be carried out in emulsion or suspension processes in aqueous media.

It is believed that acrylic co-polymers may become dispersed in the polymer network formed when the radiation-curable components of the coating composition react with one another during UV curing. The acrylic co-polymers may self-associate through hydrogen bonding interactions, polar interactions or other intermolecular interactions. It is believed that self-associative interactions may reinforce the crosslinked network formed from the radiation-curable component(s).

By varying the composition of the acrylic co-polymers, compatibility of the co-polymer with the (meth)acrylate monomer(s) in the coating composition may be adjusted. The level of association of the acrylic co-polymers with each other or other components of the coating composition may be adjusted by varying the identity and level of the co-monomer capable of associating by forming hydrogen bonds and/or through strong polar or other intermolecular interactions. The molecular weight of the acrylic co-polymers may also be controlled to promote coating composition compatibility.

The acrylic co-polymer may be present in the coating composition in an amount from 5-40 wt %, or from 10-30 wt %, or from 10-25 wt %, or from 15-25 wt %.

Suitable photoinitiators for the radiation-curable coating composition include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl)diphenyl phosphine oxide (LUCIRIN TPO, available from BASF); ethoxy(2,4,6-trimethylbenzoyl)-phenylphosphine oxide (LUCIRIN TPO-L from BASF); and combinations thereof.

The radiation-curable coating composition may include 5-40 wt. % of one or more acrylic co-polymers, 5-80 wt. % of one or more monofunctional (meth)acrylate monomers, 5-40 wt. % of one or more multifunctional (meth)acrylate monomers (or oligomers), and up to 5 wt. % of photoinitiator. The radiation-curable coating composition may include 10-30 wt. % of one or more acrylic co-polymers, 30-80 wt. % of one or more monofunctional (meth)acrylate monomers, 5-35 wt. % of one or more multifunctional (meth)acrylate monomers (or oligomers), and up to 5 wt. % of photoinitiator. The radiation-curable coating composition may include 10-25 wt. % of one or more acrylic co-polymers, 50-80 wt. % of one or more monofunctional (meth)acrylate monomers, 10-30 wt. % of one or more multifunctional (meth)acrylate monomers (or oligomers), and up to 5 wt. % of photoinitiator. The radiation-curable coating composition may include 10-25 wt. % of one or more acrylic co-polymers, 60-80 wt. % of one or more monofunctional (meth)acrylate monomers, 5-25 wt. % of one or more multifunctional (meth)acrylate monomers (or oligomers), and up to 5 wt. % of photoinitiator.

In addition to the reinforcing agent(s), monomer(s), oligomer(s), and polymerization initiator(s), the curable primary coating composition may include other additives such as an adhesion promoter, a strength additive, a reactive diluent, an antioxidant, a catalyst, a stabilizer, an optical brightener, a property-enhancing additive, an amine synergist, a wax, a lubricant, and/or a slip agent. Some additives may operate to control the polymerization process, thereby affecting the physical properties (e.g., modulus, glass transition temperature) of the polymerization product formed from the radiation-curable composition. Other additives may affect the integrity of the polymerization product of the radiation-curable coating composition (e.g., protect against de-polymerization or oxidative degradation).

Another aspect of the present disclosure relates to a method of making an optical fiber, where the method includes forming a coating on the glass (core+cladding) portion of the fiber using a radiation-curable composition that includes a reinforcing agent in accordance with the present disclosure.

The core and cladding of the coated fibers may be produced in a single-step operation or multi-step operation by methods that are well known in the art. Suitable methods include: the double crucible method, rod-in-tube procedures, and doped deposited silica processes, also commonly referred to as chemical vapor deposition ("CVD") or vapor phase oxidation. A variety of CVD processes are known and are suitable for producing the core and cladding layer used in the coated optical fibers disclosed herein. They include external CVD processes, axial vapor deposition processes, modified CVD (MCVD), inside vapor deposition, and plasma-enhanced CVD (PECVD).

The glass portion of the coated fibers may be drawn from a specially prepared, cylindrical preform which has been locally and symmetrically heated to a temperature sufficient to soften the glass, e.g., a temperature of about 2000° C. for a silica glass. As the preform is heated, such as by feeding the preform into and through a furnace, a glass fiber is drawn from the molten material. See, for example, U.S. Pat. Nos. 7,565,820; 5,410,567; 7,832,675; and 6,027,062; the disclosures of which are hereby incorporated by reference herein, for further details about fiber making processes.

The radiation-curable composition may be applied to the glass portion of the coated fiber after it has been drawn from the preform. The radiation-curable composition may be applied immediately after cooling. The radiation-curable composition may then be cured to form a solidified coating to produce a coated optical fiber. The method of curing may be thermal, chemical, or radiation-induced, such as by exposing the radiation-curable composition to an appropriate energetic source, such as ultraviolet light, actinic radiation, microwave radiation, or an electron beam, after the composition has been applied to the glass portion of the fiber. The appropriate form of initiation energy may depend on the coating compositions and/or polymerization initiator employed. Methods of applying layers of radiation-curable compositions to a moving glass fiber are disclosed in U.S. Pat. Nos. 4,474,830 and 4,585,165, the disclosures of which are hereby incorporated by reference herein.

EXAMPLES

In this example, we describe the preparation of representative acrylic co-polymers that may be used as reinforcing agents in accordance with the present disclosure. We also describe radiation-curable coating compositions that incorporate acrylic co-polymers and the process of forming films by curing the radiation-curable coating compositions. We further describe characteristics of the films.

As indicated hereinabove, acrylic co-polymers may be formed through a polymerization reaction of two or more co-monomers. At least one of the co-monomers includes a chemical group that facilitates association of the co-monomer with itself, other co-monomers, or the radiation-curable components of the composition. The association may occur in the cured product of the coating to provide reinforcement.

A representative co-polymerization reaction in which the co-monomers butyl acrylate (BA) and N-butylacrylamide (nBAM) combine to form an acrylic co-polymer reinforcing agent (P(BA-nBAM)) in accordance with the present disclosure is shown below:

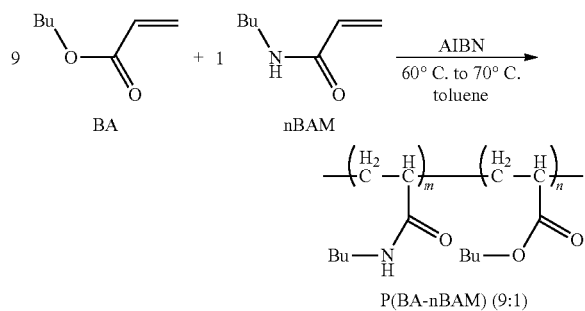

The reaction was performed as follows: to a round-bottom flask, 61.80 g (481.9 mmol) of butyl acrylate, 6.81 g (53.5 mmol) of N-n-butylacrylamide, 1.83 g (11.1 mmol) of AIBN, and 90.90 g of solvent toluene were added. AIBN (azobisisobutyronitrile) is a thermal initiator of free radical polymerization. Under nitrogen protection, the reaction mixture was heated at 65° C. overnight. The toluene solvent was then removed under reduced pressure to yield a high viscosity liquid product. The product was dried at 80° C. under vacuum overnight to form the product. From gel permeation chromatography in THF, the molecular weight of the acrylic co-polymer product relative to polystyrene standards was determined as $M_n$=11,178 g/mol, $M_w$=71,799 g/mol. The P(BA-nBAM) (9:1) product may self-associate through interactions between hydrogen bond donor groups (N—H) and hydrogen bond acceptor groups (carbonyl).

A similar reaction procedure was used to form the acrylic co-polymers shown below in Table 1.

TABLE 1

Acrylic Co-Polymers

| Co-Polymer | Co-Monomer A | Co-Monomer B | Mole Ratio Co-Monomer A:Co-Monomer B |
|---|---|---|---|
| 1 | MA | BUOMAM | 1:1 |
| 2 | MMA | VPD | 1:1 |
| 3 | MA | MAM | 1:1 |
| 4 | MMA | 4VP | 1:1 |
| 5 | — | VPD | 0:1 |
| 6 | MA | BUOMAM | 9:1 |
| 7 | MA | BUOMAM | 7:3 |
| 8 | BA | BUOMAM | 1:1 |
| 9 | BA | AM | 9:1 |
| 10 | BA | nDAM | 9:1 |
| 11 | BA | nBAM | 9:1 |
| 12 | BA | BUOMAM | 9:1 |

The following abbreviations are used in Table 1: MA=Methyl acrylate, MMA=Methylmethacrylate, BA=Butyl acrylate, BUOMAM=N-(Butoxymethylmethyl)acrylamide, VPD=N-Vinylpyrrolidone, MAM=N-Isopropylacrylamide, 4VP=4-Vinylphenol, AM=Acrylamide, nDAM=N-Dodecylacrylamide, and nBAM=N-butylacrylamide. Co-polymer 4 (1:1 MMA:4VP) is commercially available from Aldrich.

The radiation-curable coating compositions shown in Table 2 were prepared from the acrylic co-polymers listed in Table 1. The identification numbers listed in the co-polymer column of Table 2 correspond to those listed in Table 1 for the acrylic co-polymers. In addition to an acrylic co-polymer, the radiation-curable coating compositions listed in Table 2 included the monofunctional acrylate monomer PEA (phenoxyethyl acrylate), a multi-functional acrylate monomer (TPGDA or PPG2000DA) and the photoinitiator TPO ((2,4,6-trimethylbenzoyl)-diphenyl phosphine oxide). TPGDA is tripropyleneglycol diacrylate and PPG2000DA is poly(propyleneglycol) diacrylate having a molecular weight of about 2000 g/mol. Coatings 1, 7 and 14 are comparative coating compositions that lacked a co-polymer. The amounts of the components of the coating compositions are expressed as weight percent (wt. %).

TABLE 2

Radiation-Curable Coating Compositions

| Coating Composition | Co-polymer (wt. %) | PEA (wt. %) | TPGDA (wt. %) | PPG2000DA (wt. %) | TPO (wt. %) |
|---|---|---|---|---|---|
| 1  | —        | 88.5 | 8.8 | —    | 2.7 |
| 2  | 1 (17.7) | 70.8 | 8.8 | —    | 2.7 |
| 3  | 2 (17.7) | 70.8 | 8.8 | —    | 2.7 |
| 4  | 3 (17.7) | 70.8 | 8.8 | —    | 2.7 |
| 5  | 4 (17.7) | 70.8 | 8.8 | —    | 2.7 |
| 6  | 5 (17.7) | 70.8 | 8.8 | —    | 2.7 |
| 7  | —        | 86.5 | —   | 9.9  | 3.6 |
| 8  | 1 (19.4) | 70.0 | —   | 9.7  | 2.9 |
| 9  | 1 (19.4) | 70.0 | —   | 9.7  | 2.9 |
| 10 | 1 (19.4) | 63.1 | —   | 14.6 | 2.9 |
| 11 | 1 (19.4) | 65.0 | —   | 12.6 | 2.9 |
| 12 | 6 (19.4) | 63.1 | —   | 14.6 | 2.9 |
| 13 | 7 (19.4) | 63.1 | —   | 14.6 | 2.9 |
| 14 | —        | 61.2 | —   | 35.9 | 2.9 |
| 15 | 10 (19.4)| 48.5 | —   | 29.1 | 2.9 |
| 16 | 11 (19.4)| 48.5 | —   | 29.1 | 2.9 |
| 17 | 12 (19.4)| 48.5 | —   | 29.1 | 2.9 |

Coatings in the form of cured films were formed from the radiation-curable compositions given in Table 2. The cured films were prepared with the listed components using commercial blending equipment. The monomer and co-polymer components were weighed into a jacketed beaker and heated to 60° C.-70° C. Blending was continued until a homogeneous mixture was obtained. The photoinitiator was then weighed and added to the beaker. Blending was then continued until a homogeneous mixture was obtained. Films were prepared by drawing down the formulations on a glass plate using a 5 mil draw down bar. Films were cured using a Fusion D lamp with a nitrogen purge. The films received a dose of approximately 1350 mJ/cm$^2$. All samples were allowed to condition overnight in a controlled environment at 23° C. and 50% relative humidity.

The Young's modulus, tensile strength and % elongation of cured films formed from the radiation-curable compositions of Table 2 were measured. Tensile properties were measured using a Sintech MTS tensile tester. The gauge length used for testing was 5.1 cm and the test speed was 2.5 cm/minute. Tensile strength, stress at yield point (where yielding was significant), % strain at break, and Young's Modulus values were recorded.

The measured characteristics of the cured films are shown in Table 3 below, where each cured film is listed by the identification number of its coating composition (as listed in Table 2).

TABLE 3

Cured Film Tensile Properties

| Cured Film | Modulus (MPa) | Tensile Strength (MPa) | % Elongation |
|---|---|---|---|
| 1  | 4.72 ± 0.13 | 2.84 ± 0.03 | 58 ± 6   |
| 2  | 2.54 ± 0.02 | 3.12 ± 0.09 | 87 ± 7   |
| 3  | 26 ± 2      | 5.73 ± 0.18 | 89 ± 12  |
| 4  | 45 ± 1      | 4.19 ± 0.06 | 67 ± 2   |
| 5  | 100 ± 4     | 7.17 ± 0.29 | 44 ± 2   |
| 6  | 23 ± 2.4    | 3.46 ± 0.35 | 59 ± 12  |
| 7  | 0.82 ± 0.09 | 0.52 ± 0.05 | 126 ± 13 |
| 8  | 0.48 ± 0.06 | 0.36 ± 0.11 | 234 ± 28 |
| 9  | 0.64 ± 0.06 | 0.36 ± 0.03 | 194 ± 7  |
| 10 | 0.73 ± 0.08 | 0.31 ± 0.03 | 115 ± 18 |
| 11 | 0.55 ± 0.04 | 0.32 ± 0.06 | 139 ± 20 |
| 12 | 0.73 ± 0.06 | 0.47 ± 0.06 | 109 ± 11 |
| 13 | 0.53 ± 0.02 | 0.52 ± 0.08 | 172 ± 23 |
| 14 | 2.2 ± 0.4   | 0.55 ± 0.08 | 34 ± 4   |
| 15 | 0.75 ± 0.01 | 0.55 ± 0.08 | 84 ± 12  |
| 16 | 0.77 ± 0.05 | 0.60 ± 0.07 | 92 ± 11  |
| 17 | 0.88 ± 0.04 | 0.52 ± 0.06 | 75 ± 5   |

Cured films 1-6 were formed from coating compositions that included TPGDA as a diacrylate monomer component and cured films 7-17 were formed from coating compositions that included PPG2000DA as a diacrylate monomer component. Within the series of cured films 1-6, cured film 1 was a control sample that lacked an acrylic co-polymer reinforcing agent. In the compositions used to form cured films 2-6, a portion of the monofunctional acrylate PEA was replaced by an acrylic co-polymer. The results indicated that incorporation of the acrylic co-polymer lead to an increase in tensile strength in cured films 2-6 relative to control cured film 1. The % elongation was also observed to increase. Depending on the acrylic co-polymer, the Young's modulus of the cured film could be adjusted over a wide range. Cured film 2, for example, exhibited a lower modulus than control cured film 1, while cured film 5 exhibited a much higher modulus than control cured film 1.

Cured films 7-13 were formed from coating compositions that included a lesser concentration of PPG2000DA diacrylate monomer than cured films 14-17. The results for cured films 8-13 and 7-17 indicated that incorporation of an acrylic co-polymer in the coating composition provided cured films with lower modulus values and comparable tensile strength relative to control films prepared from compositions lacking an acrylic co-polymer (cured films 7 and 14).

Cured films having a range of modulus values were obtained. The identity and amount of multi-functional acrylate monomer has an important influence on the measured modulus of the cured films. Use of the higher molecular weight PPG2000DA diacrylate monomer resulted in cured films having lower modulus values that may be desirable as primary fiber coatings. A number of materials having both low modulus and moderate tensile strength values were prepared. Use of the lower molecular weight TPGDA (Coatings 1-6 in Table 3) diacrylate monomer resulted in films with higher modulus values. While the highest modulus value shown for a TPGDA-containing coating composition is ~100 MPa (Coating 5), we expect that coating compositions with increased levels of TPGDA (or other low molecular weight multi-functional acrylate) will lead to even higher modulus values and may result in cured coatings suitable for use as secondary fiber coatings.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber coating composition comprising:
   a radiation-curable monomer;
   a photoinitiator; and
   an acrylic co-polymer, said acrylic co-polymer including a first repeat unit derived from a (meth)acrylate monomer and a second repeat unit derived from an ethylenically unsaturated monomer, said (meth)acrylate and ethylenically unsaturated monomers differing in chemical composition, said acrylic co-polymer lacking a radiation-curable group.

2. The coating composition of claim 1, wherein said radiation-curable monomer includes a (meth)acrylate monomer.

3. The coating composition of claim 1, wherein said radiation-curable monomer includes a multifunctional (meth)acrylate monomer.

4. The coating composition of claim 3, wherein said multifunctional (meth)acrylate monomer includes a polyol di(meth)acrylate.

5. The coating composition of claim 1, wherein said radiation-curable monomer lacks groups capable of reacting to form urethane linkages.

6. The coating composition of claim 1, wherein said ethylenically unsaturated monomer includes a hydrogen bond donor group.

7. The coating composition of claim 6, wherein said ethylenically unsaturated monomer further includes a hydrogen bond acceptor group.

8. The coating composition of claim 7, wherein said hydrogen bond donor group is an N—H group, an O—H group, or a —$CO_2H$ group.

9. The coating composition of claim 8, wherein said hydrogen bond acceptor group is a carbonyl group.

10. The coating composition of claim 7, wherein said (meth)acrylate monomer lacks a hydrogen bond donor group.

11. The coating composition of claim 1, wherein said ethylenically unsaturated monomer is acrylamide, an N-substituted acrylamide, or vinylphenol.

12. The coating composition of claim 11, wherein said N-substituted acrylamide is selected from the group consisting of N-(Butoxymethylmethyl)acrylamide, N-Isopropylacrylamide, N-Butylacrylamide, and N-Dodecylacrylamide.

13. The coating composition of claim 11, wherein said (meth)acrylate monomer is methylmethacrylate, methyl acrylate, butyl acrylate, lauryl acrylate, ethylhexyl acrylate, ethoxylated nonylphenol acrylate, or caprolactone acrylate.

14. The coating composition of claim 1, wherein said ethylenically unsaturated monomer lacks a (meth)acrylate group.

15. The coating composition of claim 1, wherein said acrylic co-polymer lacks a urethane linkage.

16. The coating composition of claim 1, wherein said acrylic co-polymer has a molecular weight between 1500 g/mol and 150,000 g/mol.

17. The coating composition of claim 1, wherein said acrylic co-polymer has a glass transition temperature less than or equal to 0° C.

18. The coating composition of claim 1, further comprising a radiation-curable oligomer.

19. The coating composition of claim 18, wherein said radiation-curable oligomer lacks urethane linkages.

20. The coating composition of claim 1, wherein said radiation-curable monomer includes one or more monofunctional (meth)acrylate monomers and one or more multifunctional (meth)acrylate monomers or oligomers, said one or more monofunctional (meth)acrylate monomers being present in said coating composition in an amount ranging from 5-80 wt % and said one or more multifunctional (meth)acrylate monomers being present in said coating composition in an amount ranging from 5-40 wt %.

21. The coating composition of claim 20, wherein said acrylic co-polymer is present in said coating composition in an amount ranging from 5-40 wt %.

22. The coating composition of claim 1, wherein said acrylic co-polymer self-associates through hydrogen bonding interactions.

23. A coating formed by curing the coating composition of claim 1.

24. The coating of claim 23, wherein the coating lacks urethane groups.

25. An optical fiber coated with the cured product of claim 1.

26. A process of coating an optical fiber comprising:
    providing an optical fiber;
    applying a coating composition to said optical fiber, said coating composition comprising:
       a radiation-curable monomer;
       a photoinitiator; and
       an acrylic co-polymer, said co-polymer including a first repeat unit derived from a (meth)acrylate monomer and a second repeat unit derived from an ethylenically unsaturated monomer, said (meth)acrylate and ethylenically unsaturated monomers differing in chemical composition, said acrylic co-polymer lacking a radiation-curable group.

* * * * *